Sept. 18, 1923.
J. G. CULLIGAN
1,468,558
COMBINATION FILM FRAME PICTURE CARD
Filed March 22, 1923
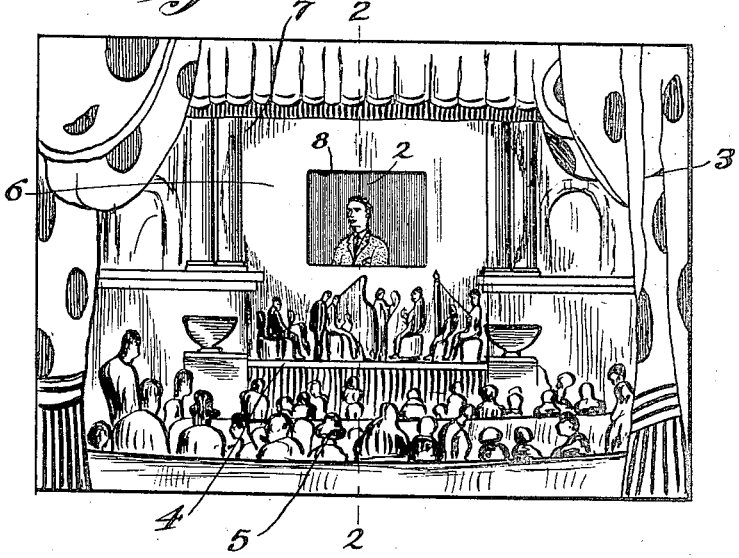
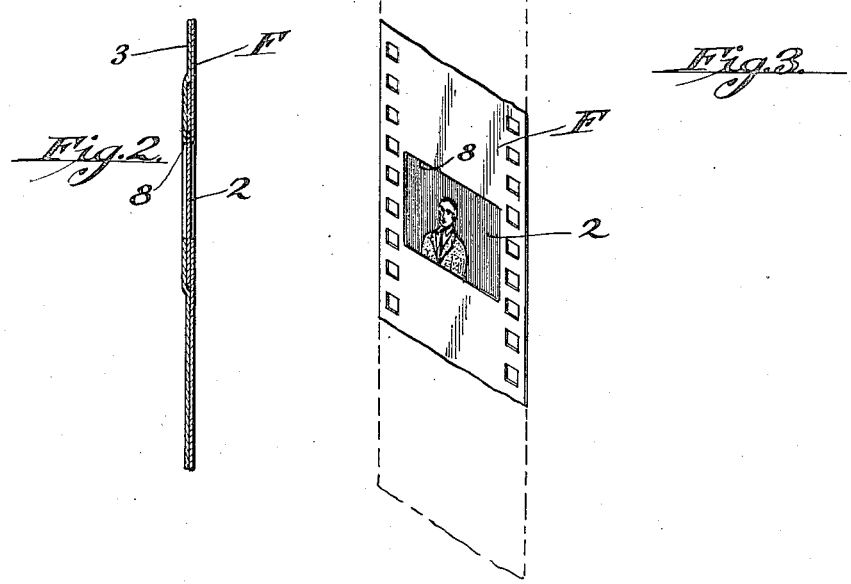
Inventor
Joseph G. Culligan
By Hazard and Miller
Attorneys Patented Sept. 18, 1923.

1,468,558

UNITED STATES PATENT OFFICE.

JOSEPH G. CULLIGAN, OF LOS ANGELES, CALIFORNIA.

COMBINATION FILM-FRAME PICTURE CARD.

Application filed March 22, 1923. Serial No. 626,304.

*To all whom it may concern:*

Be it known that I, JOSEPH G. CULLIGAN, a citizen of the United States, residing at Los Angeles, in the county of Los Angeles and State of California, have invented new and useful Improvements in Combination Film-Frame Picture Cards, of which the following is a specification.

This invention relates to picture holders and has for an object to provide a combination film-frame picture card. It is an object of the invention to provide a novelty consisting of a card having a frontispiece or picture consisting of the representation of a theatrical stage and arch, and which is provided with an aperture forming a window through the card combined with which is a motion picture film frame consisting of a developed positive or negative, or transparent print.

An object of the invention, broadly, is to provide a picture card combining a motion picture film frame and a holder providing a pictorial face representing a stage having a screen or background windowed and enclosing a mounted film frame.

Other objects and advantages will be made manifest in the following specification of an embodiment of the invention illustrated in the accompanying drawings, wherein—

Figure 1 is a front elevation of the combination picture card.

Fig. 2 is a section on line 2—2 of Figure 1, showing the installed film frame.

Fig. 3 is a perspective of a fragment of a developed picture film including one of the film frames.

The present invention, broadly, consists of the combination of a portion of a motion picture film F, which portion includes what is technically known as a film frame here designated at 2, and including a scene upon which the film has been exposed, or is a reprint of a film. To meet popular demands for actual pieces of picture films showing scenes in various plays or showing pictures of various popular characters, I provide a holder such as a card 3, shown as a rectangular, two-ply card in which the film frame 2 is adapted to be mounted in such manner that, when held to the light, the picture on the translucent film will be readily discernible by transmitted light. To further enhance the effectiveness of the mounting of the film frame the card is provided on either or both faces with a frontispiece or picture, preferably including a theatrical stage 4 and a portion of the audience 5 facing the screen or background 6 under the proscenium arch 7. The background or screen representing area 6 is provided with a window 8 entirely through the card, this window being shown as rectangular and as corresponding in configuration to said card and in which window the mounted motion picture film frame 2, shown as substantially registering with said window is disclosed so that the picture frame 2 appears as being cast or projected onto the screen 6 included in the picture on the card.

The film frame 2 is here shown as mounted between front and back plies of the card structure 3.

From the above it will be seen that I have therefore provided a novelty comprising a card having a picture face in which is represented a stage screen in which is formed a window and in which window is mounted, preferably permanently, a section of a motion picture film.

Further embodiments, modifications and variations may be resorted to within the principle of the invention.

What I claim is:

1. In a combination film-frame picture, a two-ply card having a window, and a section of motion picture film mounted between the plies of said card and comprising a film-frame substantially registering with said window, said card having a pictorial face in which is illustrated a motion picture screen so positioned that light transmitted through said frame shall appear as a picture projected on said screen.

2. In a combination film-frame picture, a two-ply card having a window corresponding in configuration to said card, and a section of motion picture film mounted between the plies of said card and comprising a film-frame substantially registering with said window, said card having a pictorial face in which is illustrated a motion picture screen so positioned that light transmitted through said frame shall appear as a picture projected on said screen.

In testimony whereof I have signed my name to this specification.

JOSEPH G. CULLIGAN.